US009342362B2

(12) United States Patent
Bruckert et al.

(10) Patent No.: US 9,342,362 B2
(45) Date of Patent: May 17, 2016

(54) SERVICE-PROCESSOR-CENTRIC COMPUTER ARCHITECTURE AND METHOD OF OPERATION THEREOF

(75) Inventors: Kevin Bruckert, Pflugerville, TX (US); Robert A. Strickland, Pflugerville, TX (US)

(73) Assignee: Nvidia Corporation, Santa Clara, CA (US)

( * ) Notice: Subject to any disclaimer, the term of this patent is extended or adjusted under 35 U.S.C. 154(b) by 659 days.

(21) Appl. No.: 13/524,802

(22) Filed: Jun. 15, 2012

(65) Prior Publication Data

US 2013/0339712 A1 Dec. 19, 2013

(51) Int. Cl.
G06F 9/24 (2006.01)
G06F 9/50 (2006.01)
G06F 9/44 (2006.01)

(52) U.S. Cl.
CPC ............ G06F 9/5027 (2013.01); *G06F 9/4401* (2013.01); *G06F 2209/509* (2013.01); *Y02B 60/142* (2013.01)

(58) Field of Classification Search
CPC ..................................................... G06F 9/5027
USPC ......................................................... 713/2, 1
See application file for complete search history.

(56) References Cited

U.S. PATENT DOCUMENTS

| | | | | |
|---|---|---|---|---|
| 4,268,902 A * | 5/1981 | Berglund et al. | ............. | 710/305 |
| 4,823,256 A * | 4/1989 | Bishop et al. | ................... | 714/10 |
| 4,894,828 A * | 1/1990 | Novy et al. | ..................... | 714/11 |
| 5,088,033 A * | 2/1992 | Binkley et al. | ................. | 703/24 |
| 5,329,625 A * | 7/1994 | Kannan et al. | ................ | 345/173 |
| 5,758,157 A * | 5/1998 | Greenstein et al. | ........... | 718/104 |
| 5,951,654 A * | 9/1999 | Avsan et al. | ...................... | 710/5 |
| 6,101,570 A * | 8/2000 | Neumyer | ...................... | 710/240 |
| 6,484,221 B1 * | 11/2002 | Lorinser et al. | ............... | 710/200 |
| 7,424,555 B2 * | 9/2008 | King et al. | ....................... | 710/14 |
| 7,574,505 B2 * | 8/2009 | Park et al. | ...................... | 709/224 |
| 2002/0091869 A1 * | 7/2002 | Jones et al. | ..................... | 709/310 |
| 2002/0143955 A1 * | 10/2002 | Shimada et al. | ............. | 709/227 |
| 2003/0046466 A1 * | 3/2003 | Delorme et al. | ............. | 710/300 |
| 2003/0152078 A1 * | 8/2003 | Henderson et al. | .......... | 370/389 |
| 2004/0028073 A1 * | 2/2004 | King et al. | ..................... | 370/461 |
| 2006/0135042 A1 * | 6/2006 | Frost et al. | ........................ | 451/5 |
| 2007/0283349 A1 * | 12/2007 | Creamer et al. | ............. | 718/100 |
| 2008/0010445 A1 * | 1/2008 | Agha et al. | ........................ | 713/1 |
| 2009/0222654 A1 * | 9/2009 | Hum et al. | ..................... | 713/100 |
| 2010/0064072 A1 * | 3/2010 | Tang et al. | ...................... | 710/39 |
| 2010/0081478 A1 * | 4/2010 | Itoh et al. | ...................... | 455/566 |
| 2010/0169968 A1 * | 7/2010 | Shanbhogue et al. | .......... | 726/22 |
| 2010/0195503 A1 * | 8/2010 | Raleigh | ......................... | 370/235 |
| 2011/0018854 A1 * | 1/2011 | Barclay et al. | ................ | 345/211 |

\* cited by examiner

*Primary Examiner* — Thomas Lee
*Assistant Examiner* — Volvick Derose

(57) ABSTRACT

A computer system and a method of operating a service-processor-centric computer system. In one embodiment, the computer system includes: (1) a CPU configured to issue control signals and (2) a service processor configured for intercepting and handling the control signals, the handling including delaying, modifying or ignoring the control signals, the service processor further configuring for issuing highest-priority control signals.

20 Claims, 2 Drawing Sheets

SERVICE-PROCESSOR-CENTRIC COMPUTER ARCHITECTURE AND METHOD OF OPERATION THEREOF

TECHNICAL FIELD

This application is directed, in general, to computer architectures and, more specifically, to microprocessor-based computer architectures.

BACKGROUND

From an architectural standpoint, computer systems are centered about a general-purpose central processing unit (CPU), which is responsible for controlling the system and performing at least the bulk of data processing. The rest of the architecture radiates out from the CPU and includes memory and peripherals (e.g., input/output, or I/O, devices).

In a microprocessor-based computer system (such as found in a modern desktop, laptop, tablet or Smartphone), the CPU takes the form of a microprocessor having one or more processing cores. The rest of the system typically includes volatile memory (e.g., dynamic random-access memory, or DRAM), a graphics interface, nonvolatile (e.g., flash or read-only) memory, a network interface, one or more disk drives and keyboard, mouse and other interfaces (e.g., via a plurality of ports, such as Universal Serial Bus, or USB, ports).

As microprocessor-based computer systems have become more powerful and capable, and as microprocessors have become more complex and energy-consumptive (.e., hotter), it has become desirable to distribute the processing. Accordingly, "chipsets" (a term used in the art to describe one or more integrated circuits that work in tandem with, and as an interface for, a particular type of CPU) and special-purpose processors, such as math co-processors, service processors and graphics processing units (GPUs) are now routinely used to take some of the processing load off the CPU. In such systems, the CPU performs general processing, and the special-purpose processors perform the tasks for which they were specifically designed. Irrespective of the degree or extent to which processing has become more distributed, the CPU still controls the system and remains the center of the architecture.

SUMMARY

One aspect provides a computer system. In one embodiment, the computer system includes: (1) a CPU configured to issue control signals and (2) a service processor configured for intercepting and handling the control signals, the handling including delaying, modifying or ignoring the control signals, the service processor further configuring for issuing highest-priority control signals.

In another embodiment, the computer system includes: (1) a CPU configured to issue control signals, (2) a service processor configured for intercepting and handling the control signals, the handling including delaying, modifying or ignoring the control signals, the service processor further configuring for issuing highest-priority control signals (3) at least one peripheral device coupled to the CPU via the service processor, (4) a network interface coupled to the CPU via the service processor and (5) at least one drive coupled to the CPU via the service processor.

Another aspect provides a method of operating a service-processor-centric computer system. In one embodiment, the method includes: (1) initializing the system in a boot state, the initializing comprising booting a service processor of the system and then booting a CPU of the computer system, (2) transitioning the system to a cooperative processing state, (3) further transitioning the system to one of a separate processing state and a service processing state, (4) transitioning the system back to the cooperative processing state and (4) transitioning the system to a shutdown state.

BRIEF DESCRIPTION

Reference is now made to the following descriptions taken in conjunction with the accompanying drawings, in which.

DETAILED DESCRIPTION

As stated above, CPUs control conventional computer systems. (It should be mentioned as an aside that some ancillary circuits may assume temporary control during startup, shutdown, or under some fault conditions, but the CPU remains the architectural center and predominates during normal operation.) Accordingly, CPUs are deliberately equipped with circuitry to govern bus access, assert highest-priority interrupts and otherwise provide ultimate system control. CPUs also tend to be optimized for single-threaded (non-parallel) processing.

It is realized herein, however, that significant advantages may result from a computer architecture that does not have its CPU as its architectural center. ("Center" is used herein to denote importance relative to other system components, reflected in terms of priority and control, and not in terms of physical location on, e.g., a circuit board.) It is also realized herein that an improved architecture may result were a service processor to be made the architectural center and given ultimate system control and the CPU, being a general-purpose device, made subject to the control of the service processor. It is further realized that an architecture that operates with an unmodified CPU may be advantageous in some applications. As will be described hereinafter, such an improved architecture can exhibit significant advantages with respect to speed, power consumption, security and flexibility. For purposes of this disclosure, a CPU is a general-purpose processor, such as a microprocessor, that is designed to exercise top-priority control over a computer system. A service processor, in contrast, has an internal architecture attuned to carrying out more specialized tasks, such as carrying out computationally-intensive mathematics; rendering vector or raster graphics; or encrypting and decrypting data. Because such specialized tasks are well-suited for parallel processing, service processors are often optimized for parallel processing.

Figure 1:
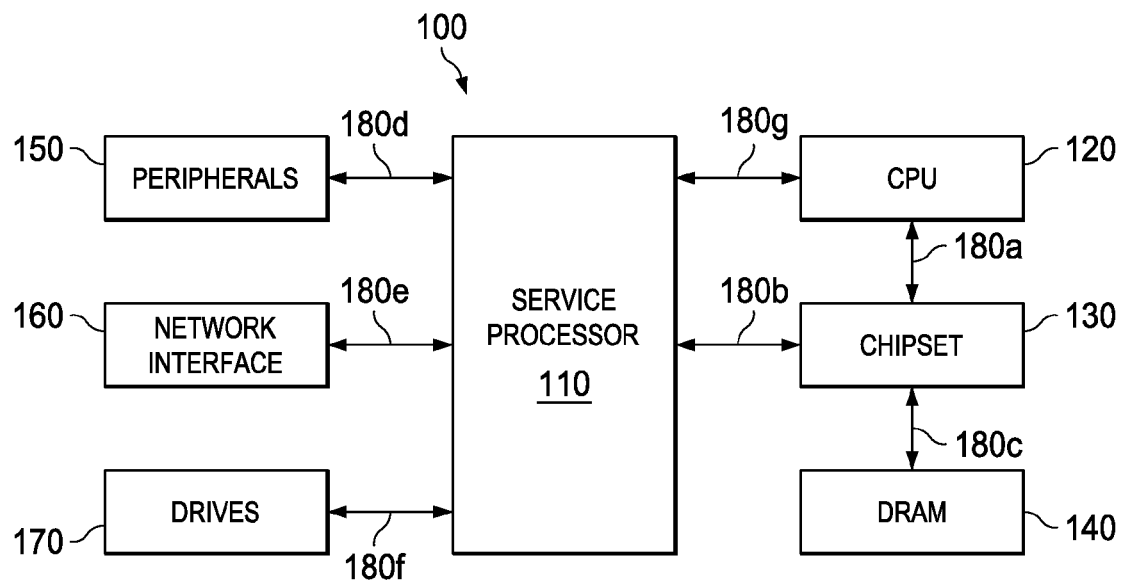
FIG. 1 is a block diagram of one embodiment of a service-processor-centric computer architecture.

FIG. 1 is a block diagram of one embodiment of a service-processor-centric computer architecture 100. A service processor 110 lies at the center of the architecture 100. The service processor 110 is a special-purpose processor. In the illustrated embodiment, the service processor 110 is optimized for parallel-processing. In one embodiment, the service processor 110 is a unified collection of strong co-processors managed by a lightweight general-purpose unit. As those skilled in the art understand, desktop, laptop, tablet, and even system-on-a-chip (SoC) CPUs have two primary functions: (1) managing a system and (2) producing results on their own.

These two primary functions are jointly optimized in the design of a CPU. In contrast, lightweight general-purpose units, while capable of producing results on their own, are primarily focused on management activities. The design of a lightweight general-purpose unit reflects this primary focus.

The architecture 100 further includes a CPU 120. In contrast with the service processor 110, the CPU 120 is jointly optimized to managing a system and produce results on its own. In the illustrated embodiment, the CPU 120 is optimized for single-threaded (non-parallel) processing. Generally speaking, the CPU 120 is configured to execute tasks faster than the service processor 110. However, the service processor 110 may be capable of executing certain tasks, namely those for which the service processor 110 was particularly designed, faster than the CPU 120 by executing the tasks through one or more of its strong co-processors. Also generally speaking, the CPU 120 consumes more power than does the service processor 110 in normal operation. In one embodiment, the CPU 120 is a Core™ or Pentium™ processor commercially available from the Intel Corporation of Santa Clara, Calif. However, those skilled in the pertinent art will understand that other general-purpose processors, including those that are not classified as microprocessors, may be employed as the CPU 120.

In the illustrated embodiment, a chipset 130 is coupled to the CPU 120 via a bus 180a. As described above, the chipset 130 includes at least one integrated circuits external to the CPU 120, but nonetheless designed to work in tandem with, and as an interface for, the CPU 120. For this reason, the bus 180a is typically a proprietary bus particular to the CPU 120 and the chipset 130. For example, if the CPU 120 is a Core™ processor, the chipset 130 may be a B75 chipset, also commercially available from the Intel Corporation of Santa Clara, Calif.

In the embodiment of FIG. 1, a bus 180b couples the service processor 110 to the chipset 130. While the bus 180b may be a proprietary bus, it more typically conforms to an industry standard, such as the Peripheral Component Interconnect (PCI) standard.

DRAM 140 is coupled to the chipset 130 via a bus 180c. The DRAM 140 may be of any size, speed or configuration and may include other types of memory, such as read-only or flash memory. The bus 180c is typically known as a "system bus."

One or more peripherals 150 are coupled to the service processor 110 via a bus 180d. The one or more peripherals may include USB devices, such as USB flash drives (UFDs), USB hard drives, keyboards, trackballs, mice, game controllers, cameras and sound cards. Accordingly, the bus 180d may include a PCI or other type of expansion bus and one or more USB ports.

In the illustrated embodiment, a network interface 160 is coupled to the service processor 110 via a bus 180e. In various embodiments, the network interface 160 is a wireless (e.g., IEEE 802 interface) or wireline (e.g., Ethernet™ copper or FX fiber interface). The bus 180e may include a PCI or other type of expansion bus.

One or more drives 170 are shown as being coupled to the service processor 110 via a bus 180f. The various of the one or more drives 170 may be solid-state or disk-based, may be magnetic, optical or magneto-optic and provide nonvolatile mass storage for data processed by the system 100. The bus 180 may be of any type, including Integrated Drive Electronics (IDE), enhanced IDE (EIDE), and Advanced Technology Attachment (ATA) of either the serial (SATA) or parallel (PATA) kind.

While the architecture of FIG. 1 so far appears conventional in many ways, it is not. In a conventional architecture, the CPU 120 has the highest priority and is the ultimate authority for the system 100. Accordingly, the CPU 120 governs the buses 180a, 180b, 180c and controls, either directly or indirectly, the buses 180d, 180e, 180f. No other part of a conventional architecture has co-equal or superior control in the course of normal system operation.

In contrast, in the architecture of FIG. 1, the service processor 110 has the highest priority and is the ultimate authority for the system 100. The CPU 120, especially if it is a conventional, commercially-available CPU, issues conventional, top-priority control signals, but they are routed to the service processor 110, which then determines how to handle the control signals. In some cases, depending upon how the service processor 110 is configured or programmed, the service processor 110 may mimic or repeat the control signals, such that the CPU 120 still appears to be in control of the system. In other cases, again depending upon configuration or programming, the service processor 110 may delay, modify (e.g., change the type or priority of) or altogether ignore (e.g., mask) the control signals the CPU 120 issues. It is important to note that the CPU 120 does not enjoy the same privilege with respect to the control signals the service processor 110 issues; the CPU 120 cannot delay, modify or change the priority of any of the control signals the service processor 110 issues.

From an architectural standpoint, the control signals issued by the CPU 120 may be conveyed via the bus 180a, through the chipset 130 and via the bus 180b to the service processor 110. In an alternative embodiment, a separate bus 180g may directly couple the CPU 120 and the service processor 110, bearing the control signals issued by the CPU 120 and separating the control signals from other control signals.

Figure 2:
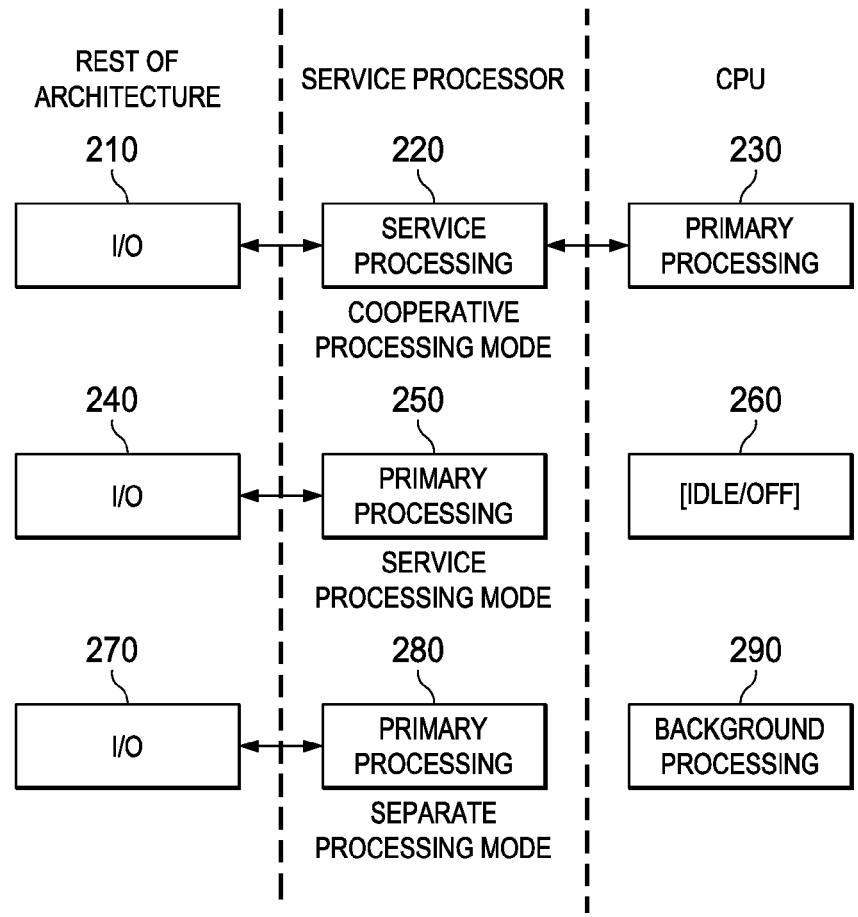
FIG. 2 is a diagram showing different operational modes of one embodiment of a service-processor-centric computer architecture.

Having described various embodiments of the novel architecture in general, various aspects of its operation will now be described, which will, among other things, shed some light on its potential advantages in certain applications. FIG. 2 is a diagram showing different operational modes of one embodiment of a service-processor-centric computer architecture. In FIG. 2, the architecture is represented in three columns. The middle column represents the service processor (110 of FIG. 1). The right-hand column represents the CPU (120 of FIG. 1). The left-hand column represents at least some of the rest of the architecture (including, e.g., the peripherals 150, the network interface 160, the drives 170, and perhaps even the DRAM 140).

The illustrated embodiment of the architecture of FIG. 1 is configured to operate in three general modes: a "cooperative processing" mode, a service processing mode and a "separate processing" mode. The cooperative processing and separate processing modes may be considered "high-power" modes relative to the service processing mode. Of course, "high-power" and "low-power" are relative terms and not necessarily accurate in all instances.

In the cooperative processing mode, the CPU performs primary processing 230 for the system, the service processor provides service processing 220 (e.g., math, graphics or other function-specific processing) for the CPU, and the rest of the architecture provides an I/O support role 210, as FIG. 2 shows. The service processing may include the provision of "filters" for the benefit of the CPU. As those skilled in the pertinent art are aware, filters are ancillary programs that process and often modify streams of data. Filters include encryption/decryption filters, protocol stack filters, hardware abstraction filters, device handlers and network masks and address mapping filters.

Arrowheaded lines spanning the CPU, the service processor and the rest of the architecture signify that substantial control, address and data communication and processing are occurring thereamong. It should be borne in mind that, while the service processor only provides service processing for the CPU, the service processor is in control of the overall system, handling CPU control signals as described above.

In the service processing mode, the service processor performs the primary processing 250 for the system, and the rest of the architecture provides the I/O support role 240. The CPU is idle (e.g., in a sleep mode) or turned off 260. In the service processing mode, the service processor functions as the de facto CPU for the system. While an arrowheaded line spans the service processor and the rest of the architecture, FIG. 2 omits an arrowheaded line spanning the service processor and the CPU to signify that the CPU is idle or turned off 260 in the service processing mode and thus unavailable for substantial control, address or data communication or processing.

In the separate processing mode, the service processor performs the primary processing 280 for the system, and the rest of the architecture provides the I/0 support role 270. However, unlike the service processing mode, the CPU is active, and not idle. In the separating mode, the architecture essentially splits into two separate systems. One system includes the service processor and the rest of the architecture, and the other system includes the CPU (and also the chipset 130 and DRAM 140 of FIG. 1 in some embodiments. In the separate processing mode (as with the service processing mode), the service processor functions as the de facto CPU for the system that includes the service processor. The CPU functions as the CPU for the system that includes the CPU and is typically involved in background processing 290 of some sort. As with the service processing mode, FIG. 2 omits an arrowheaded line spanning the service processor and the CPU to signify that insubstantial control, address or data communication or processing occurs between the service processor and the CPU in the separate processing mode.

In general, the three above-described modes may be employed to advantage as follows. (1) The cooperative processing mode is advantageous for normal system operation, particularly involving substantial user interaction and intensive data processing. (2) The service processing mode is advantageous for relatively low-power operation, particularly involving only intermittent user interaction or light data processing. (3) The separate processing mode is advantageous for allowing the relatively light data processing of the service processing mode while carrying out substantial data processing activity in the background (e.g., operating system or application software installation or updating or operating system rebooting).

Figure 3:
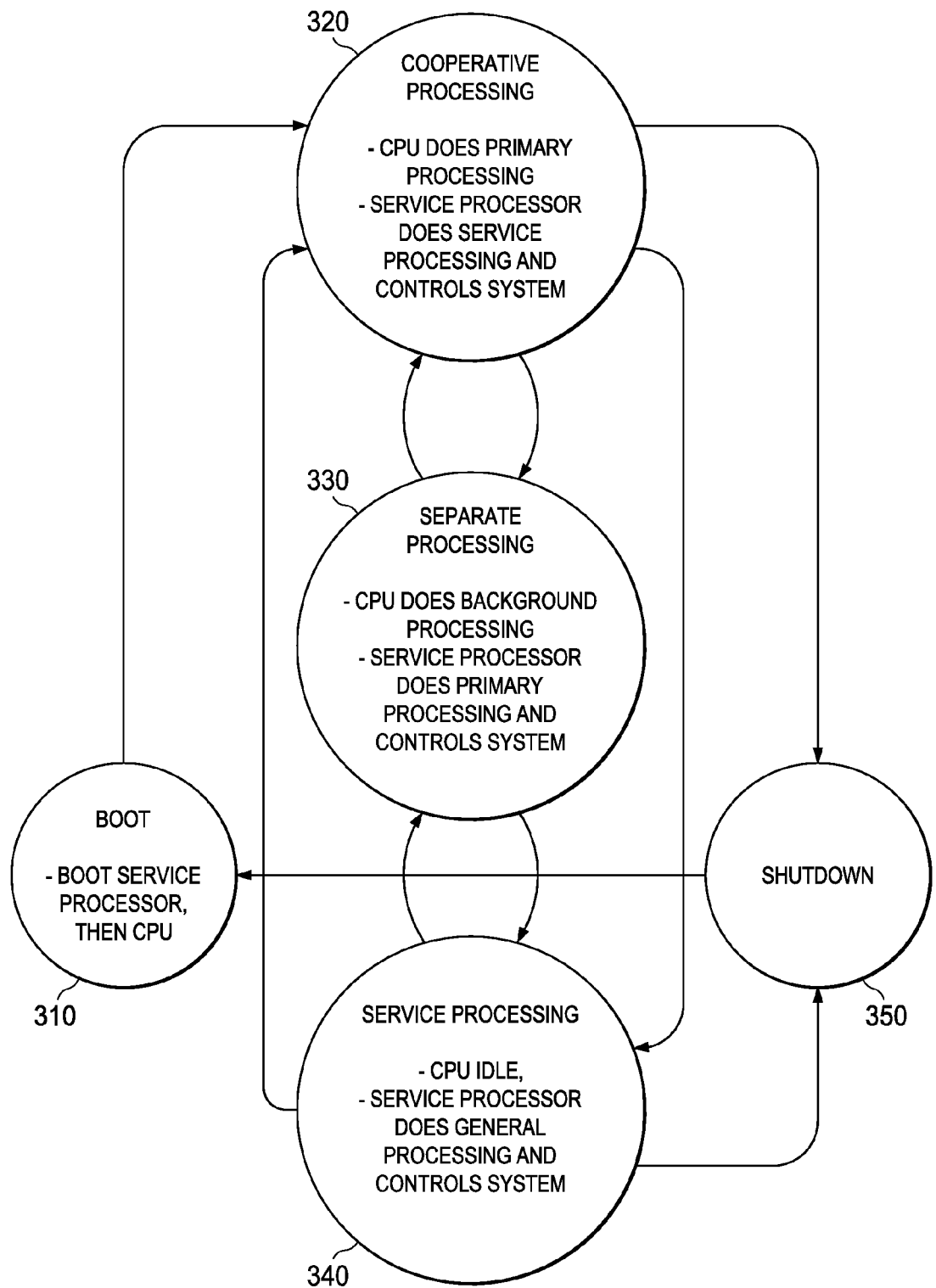
FIG. 3 is a state diagram showing states and transitions thereamong illustrating a method of operating one embodiment of a service-processor-centric computer system.

FIG. 3 is a state diagram showing states and transitions thereamong illustrating a method of operating one embodiment of a service-processor-centric computer system. FIG. 3 is presented primarily for the purpose of showing how the architecture of FIG. 1 may be initialized, shut down or transitioned among the various modes described in conjunction with FIG. 2.

In a boot state 310, a system incorporating an embodiment of the architecture of FIG. 1 is initialized. Because the service processor is at its architectural center, the service processor is booted first, followed by the CPU. This is opposite a typical conventional system boot order.

Once the system has completed initialization, it transitions out of the boot state into a cooperative processing state 320. In the cooperative processing state 320, the CPU performs primary processing, and the service processor provides service processing and controls the system.

The illustrated embodiment of the system can then transition, either programmatically or in response to an explicit user command, to a separate processing state 330. In the separate processing state 330, the CPU performs primary (background) processing for its separate system, and the service processor provides primary processing for its separate system. The system can then transition, either programmatically or in response to an explicit user command, back to the cooperative processing state 320.

The illustrated embodiment of the system can alternatively transition, either programmatically or in response to an explicit user command, to a service processing state 340. In the service processing state 340, the service processor provides primary processing for the separate system, and the CPU is idle or turned off. The system can then transition, either programmatically or in response to an explicit user command, back to the cooperative processing state 320.

The illustrated embodiment of the system can also transition, either programmatically or in response an explicit user command, from the separate processing state 330 to the service processing state 340. The system can then transition, either programmatically or in response to an explicit user command, back to the cooperative processing state 320.

The illustrated embodiment of the system can then transition to a shutdown state 350 from either the cooperative processing state 320 or the service processing state 340, either programmatically or in response to an explicit user command. In an alternative embodiment, the system can also transition to the shutdown state 350 from the separate processing state 330. However, care should be taken not to corrupt data being processed by the CPU in the background in making such transition.

Having described modes of operation and transitions thereamong, some applications that would find advantageous use of the architecture disclosed herein will now be described.

Gaming: Gaming is widely regarded as a difficult activity for a computer system to undertake. It usually requires substantial user interaction and intensive data processing and usually features the rendering of complex graphics. Gaming is a good candidate for the cooperative processing mode, in which a graphics-oriented service processor can, in the context of the architecture of FIG. 1, not only function as a GPU to render the graphics, but also handle I/O with the peripherals and the drives. This frees the CPU to handle the bulk of the processing associated with gameplay. Unlike a conventional architecture, the novel architecture disclosed herein can carry out the graphics and I/O functions in the service processor and not burden the CPU with the "overhead" of controlling those functions.

Drive security: Nonvolatile storage security is of particular concern in portable computer systems, such as those taken on trips by so-called "road warriors." The data on the drives may be disclosed if the computer is lost or stolen. To address this this issue, encryption has begun to be used to increase the security of the data stored on the drives. Unfortunately, in a conventional architecture, the CPU suffers the burden of encrypting and decrypting the data communicated with the drives. In the cooperative processing mode, the service processor can perform encryption and decryption with respect to the data transferred to and from the drives, perhaps in the context of a virtual private network (VPN) established between the service processor and the drives. Like the gaming application described above, the CPU is not burdened with controlling either the encryption or the decryption and is therefore free to perform other functions.

Business server: Servers commonly used by businesses perform many "housekeeping" or background tasks that are not directly related to the serving of files, printers or network resources. In the cooperative processing mode, the service processor can perform housekeeping or background tasks such as anti-virus scanning, terminal services display compression and firewall packet "sniffing." Like the gaming and drive security applications described above, the CPU is not burdened with controlling the carrying out of this task and therefore left to perform other functions.

Home desktop computer: Home computers are often used sporadically. Conventional architectures provide a sleep mode in which the CPU is idled or turned off to save power. Unfortunately, time is required to transition a computer out of sleep mode, perhaps frustrating its user. In contrast to conventional architectures, the architecture disclosed herein leaves the service processor active in the service processor mode, meaning that relatively light processing is available on demand. Thus, the home computer can function as an "instant-on" Internet appliance or media player, perhaps while transitioning to the cooperative processing mode for more substantial processing, such as may be needed for gaming or finance. The drive security function described above can also be incorporated, allowing each user to have his own virtual, secure drive.

Laptop computer: Like the home desktop computer application described above, the architecture disclosed herein allows a laptop computer to function in the service processing mode as an instant-on Internet appliance or media player. The service processor can undertake these or other relatively light-processing tasks without engaging the CPU, potentially resulting in significantly lower power usage. In some embodiments, the system can transition to the service processing mode without the user being aware of it.

Other applications: The architecture disclosed herein may have one or more of the following abilities or advantages, depending upon the manner in which it is embodied in a particular system. In the separate processing mode, a user can browse the Internet or play media (using the service processor) while the CPU is installing or updating the operating system. In the cooperative processing mode or service processing mode, the service processor can mirror the drives or otherwise back up data. In the cooperative processing mode, the service processor can act as a controller for drives arranged in a redundant array of independent disks (RAID) without requiring an application-specific integrated circuit (ASIC) dedicated to RAID. Likewise, in the cooperative processing mode, the service processor can act as a VPN controller without requiring a network interface card (NIC) ASIC. In the separate processing mode or the service processing mode, the service processor can cooperate with network-based processing resources to implement a kernel-based virtual machine (KVM) without requiring processing by the CPU. The service processor can also perform remote power and reset control functions via the network. In the cooperative processing mode, the CPU can cooperate with network-based processing resources to implement a KVM, while the service processor supports the KVM with functions such as video compression.

The specialized functions performed by the service processor can also be updated via software or firmware without burdening the CPU. This is in contrast to conventional architectures that use non-upgradeable ASICs or burden the CPU with software or firmware updates. The service processor can act as a virtual machine manager (VMM), or "hypervisor," to the peripherals, network or drives, allowing the peripherals, network or drives to be "virtualized" to support multiple operating systems with high security.

In some embodiments, the cooperative processing mode could be employed to allow an operating system to configure tasks for processing by the service processor. The service processing mode can then be entered, in which the CPU is idled or turned off, and the service processor processes the tasks that were set up in the cooperative processing mode.

In some embodiments, custom background applications, such as web browsers and media players, can use the service processor while the CPU is idle or turned off. In other embodiments, devices such as network-attached storage (NAS) and digital video disc (DVD) drives may be able to be controlled remotely without the CPU's involvement. In general, the service processor is able to perform background, housekeeping and driver tasks for the CPU without requiring the CPU's control or intervention, leaving the CPU free for more general processing.

Those skilled in the art to which this application relates will appreciate that other and further additions, deletions, substitutions and modifications may be made to the described embodiments.

What is claimed is:

1. A computer system, comprising:
   a central processing unit configured to issue control signals; and
   a service processor configured for intercepting and handling said control signals, said handling including delaying, modifying or ignoring said control signals, said service processor further configuring for issuing highest-priority control signals, wherein said service processor is further configured for performing a primary processing of said system.

2. The system as recited in claim 1 further comprising at least one peripheral device coupled to said central processing unit via said service processor.

3. The system as recited in claim 1 further comprising a network interface coupled to said central processing unit via said service processor.

4. The system as recited in claim 1 further comprising at least one drive coupled to said central processing unit via said service processor.

5. The system as recited in claim 1 wherein said service processor is configured to place said system in a cooperative processing mode.

6. The system as recited in claim 1 wherein said service processor is configured to place said system in a separate processing mode.

7. The system as recited in claim 1 wherein said service processor is configured to place said system in a service processing mode.

8. A method of operating a service-processor-centric computer system, comprising:
   initializing said system in a boot state, said initializing comprising booting a service processor of said system and then booting a central processing unit of said computer system;
   transitioning said system to a cooperative processing state;
   further transitioning said system to one of a separate processing state and a service processing state;
   transitioning said system back to said cooperative processing state; and
   transitioning said system to a shutdown state.

9. The method as recited in claim 8 further comprising employing said service processor to carry out intercepting and handling of control signals issued by said central processing unit, said handling including delaying, modifying or ignoring said control signals.

10. The method as recited in claim 8 further comprising executing, in said service processor and in said cooperating processing state, a filter with respect to at least one peripheral device.

11. The method as recited in claim 8 further comprising executing, in said service processor and in said cooperating processing state, a filter with respect to a network.

12. The method as recited in claim 11 wherein said filter is configured to establish a virtual private network in said network.

13. The method as recited in claim 8 further comprising executing, in said service processor and in said cooperating processing state, a filter with respect to at least one drive.

14. The method as recited in claim 13 wherein said filter is configured to perform encryption and decryption with respect to data communicated with said at least one drive.

15. A computer system, comprising:
 a central processing unit configured to issue control signals;
 a service processor configured for intercepting and handling said control signals, said handling including delaying, modifying or ignoring said control signals, said service processor further configuring for issuing highest-priority control signals, wherein said service processor is further configured for performing a primary processing of said system;
 at least one peripheral device coupled to said central processing unit via said service processor;
 a network interface coupled to said central processing unit via said service processor; and
 at least one drive coupled to said central processing unit via said service processor.

16. The system as recited in claim 15 wherein said service processor is configured to place said system in a cooperative processing mode.

17. The system as recited in claim 15 wherein said service processor is configured to place said system in a separate processing mode.

18. The system as recited in claim 15 wherein said service processor is configured to place said system in a service processing mode.

19. The system as recited in claim 15 further comprising a chipset coupled to said central processing unit and dynamic random-access memory coupled to said central processing unit via said chipset.

20. The system as recited in claim 15 wherein a separate bus directly coupling said central processing unit and said service processor and configured to bear said control signals issued by said central processing unit.

* * * * *